(12) United States Patent
Yonemura et al.

(10) Patent No.: US 8,895,682 B2
(45) Date of Patent: *Nov. 25, 2014

(54) THERMOPLASTIC ACRYLIC RESIN, AND MOLDED PRODUCT THEREOF

(75) Inventors: Masami Yonemura, Tokyo (JP); Mayuko Kimura, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 395 days.

This patent is subject to a terminal disclaimer.

(21) Appl. No.: 13/055,933

(22) PCT Filed: Jun. 23, 2009

(86) PCT No.: PCT/JP2009/061405
§ 371 (c)(1),
(2), (4) Date: Jan. 25, 2011

(87) PCT Pub. No.: WO2010/013557
PCT Pub. Date: Feb. 4, 2010

(65) Prior Publication Data
US 2011/0130535 A1 Jun. 2, 2011

(30) Foreign Application Priority Data
Jul. 31, 2008 (JP) ............... P2008-198678
Jul. 31, 2008 (JP) ............... P2008-198687

(51) Int. Cl.
*C08F 220/14* (2006.01)
*G02B 1/04* (2006.01)

(52) U.S. Cl.
CPC ............. *G02B 1/04* (2013.01); *C08F 220/14* (2013.01)
USPC ......... 526/317.1; 526/319; 526/272; 526/266

(58) Field of Classification Search
CPC .................. C08F 220/14; G02B 1/04
USPC .............. 526/317.1, 272, 266, 319
See application file for complete search history.

(56) References Cited

U.S. PATENT DOCUMENTS

| | | | |
|---|---|---|---|
| 5,187,012 A | 2/1993 | Takahashi et al. | |
| 5,198,305 A | 3/1993 | Wada et al. | |
| 5,574,117 A * | 11/1996 | Yoshida et al. | 526/224 |

FOREIGN PATENT DOCUMENTS

| | | | |
|---|---|---|---|
| CN | 1946797 A | | 4/2007 |
| EP | 0470260 A1 * | | 9/1991 |
| EP | 0 470 260 A1 | | 2/1992 |
| JP | 49-13852 | | 4/1974 |
| JP | 57-153008 | | 9/1982 |
| JP | 59-221314 | | 12/1984 |
| JP | 60071661 A * | | 4/1985 |
| JP | 60-147417 | | 8/1985 |
| JP | 63-1964 | | 1/1988 |
| JP | 63-264613 | | 11/1988 |
| JP | 64-14220 | | 1/1989 |
| JP | 03-086712 | | 4/1991 |
| JP | 03086712 A * | | 4/1991 |
| JP | 03-123356 | | 5/1991 |
| JP | 4-227613 | | 8/1992 |
| JP | 4-356501 | | 12/1992 |
| JP | 05-186659 | | 7/1993 |
| JP | 05186659 A * | | 7/1993 |
| JP | 5-288929 | | 11/1993 |
| JP | 05-311025 | | 11/1993 |
| JP | 05311025 A * | | 11/1993 |
| JP | 8-85729 | | 4/1996 |
| JP | 10-130449 | | 5/1998 |
| JP | 10130449 A * | | 5/1998 |
| JP | 2886893 | | 2/1999 |
| JP | 3521374 | | 2/2004 |
| JP | 2005-148720 A | | 6/2005 |
| JP | 3711666 | | 8/2005 |
| JP | 2006-131898 A | | 5/2006 |
| JP | 2006-274118 A | | 10/2006 |
| JP | 2007-261265 | | 10/2007 |

OTHER PUBLICATIONS

Yoshimi, Phase-Difference Film, Japan Scientific Societies Press, 155-173, 1988.
Miyatake, Assignment and improvement Conditions of Optical Film for Large-Screen LCD Displays, 45-52, 2005.
International Search Report from PCT/JP2009/061405.
Notice of Allowance dated Mar. 29, 2011, Japanese Patent Application No. P2009-548047.
English translation of International Preliminary Report on Patentability, PCT/JP2009/061405.
Office Action issued in corresponding Korean Patent Application No. 2012-052986348 dated Sep. 7, 2012.
PCT/JP2008/073449—International Preliminary Report on Patentability.

* cited by examiner

*Primary Examiner* — Michael M Bernshteyn
(74) *Attorney, Agent, or Firm* — Morgan, Lewis & Bockius LLP

(57) ABSTRACT

The present invention provides a thermoplastic acrylic resin of a copolymer comprising 10 to 70% by weight of a repeating unit derived from the particular methacrylate monomer, 5 to 40% by weight of a repeating unit derived from the particular vinyl aromatic monomer, and 20 to 50% by weight of a repeating unit of the particular cyclic acid anhydride, characterized in that a molar ratio (B/A) is within the range of more than 1 to not more than 10, wherein (A) is a content of the repeating unit of the vinyl aromatic monomer and (B) is a content of the repeating unit of the cyclic acid anhydride, and the total amount of remaining monomers to 100 parts by weight of the copolymer is not more than 0.5 part by weight.

28 Claims, No Drawings

THERMOPLASTIC ACRYLIC RESIN, AND MOLDED PRODUCT THEREOF

CROSS-REFERENCE TO RELATED APPLICATIONS

The present application is a U.S. National Phase Application of International Application PCT/JP2009/061405, filed Jun. 23, 2009, which claims the benefit of Japanese Patent Application Nos. P2008-198687, filed Jul. 31, 2008, and P2008-198678, filed Jul. 31, 2008, which is hereby incorporated by reference in its entirety.

TECHNICAL FIELD

The present invention relates to a thermoplastic acrylic resin having high heat resistance and low photoelastic coefficient, and excellent in thermal stability capable of controlling the retardation by drawing, and relates to a molded article thereof.

BACKGROUND ART

Recently, with the advancement of flat panel displays such as liquid crystal display devices, plasma displays and organic EL display devices; IR sensors, optical waveguides, and the like, to optical materials to be used, there have been required not only excellent transparency but high heat resistance and exhibition of necessary birefringence.

For instance, in the case of a protective film of polarizing plate used for a polarizing plate of liquid crystal, an optical material having a lower birefringence, even with identical total light transmittance, is required. On the other hand, in the case of ¼ wavelength plate having function which changes linear polarization polarized by a polarizing plate to circular polarization, an optical material capable of intentionally exhibiting birefringence of required size is necessary.

Further, as a result of larger flat panel displays, a molded article composed of optical material to be used gets larger. However, there is a problem that contrast becomes lower because distribution of birefringence occurs due to bias of external force. In order to make the distribution of birefringence smaller, an optical material having a small change of birefringence due to external force, that is, a smaller absolute value of photoelastic coefficient is required.

Here, in the case where an optical material is a high molecular compound, for instance, when molding by extrusion molding, since the influence of orientation of high molecular chain during melt extrusion molding tends to remain, a molded article having a considerable birefringence is obtained. On the other hand, when molding by cast molding, since the orientation of high molecular chain does not occur, a molded article having no birefringence is obtained. Though in the molded articles obtained by each method, intended birefringence can be produced by drawing, there are problems (i) that, in the case of a material having a property of widely changing birefringence by a little drawing, it is difficult to control its retardation, and (ii) that, in the case of a material which cannot give a necessary birefringence if a draw ratio is not high, the processing is difficult.

Methacryl-based resins represented by methyl methacrylate homopolymer (PMMA) are excellent in transparency and have a low birefringence, and are utilized for various optical uses, but are insufficient in heat resistance. Similarly, styrene-based resins represented by styrene homopolymer (PS) are excellent in transparency, but have a remarkably large birefringence value and are insufficient in heat resistance.

Accordingly, it is required to develop an optical material having a proper retardation suitable for, for instance, manufacturing of a retardation film such as a ¼ wavelength plate, having a smaller change of birefringence by external force and a higher heat resistance (referring to Non-patent Literatures 1 and 2).

As well-known peripheral techniques of the present invention, a three-component copolymer prepared by methyl methacrylate, styrene and maleic anhydride which constitute the thermoplastic acrylic resin of the present invention are disclosed, for example, in Patent Literatures 1 to 4. In Patent Literature 1, there is disclosed the three-component copolymer of methyl methacrylate: 60 to 90% by mass, styrene: 5 to 20% by mass, maleic anhydride: 5 to 20% by mass, and is described that it is preferable from the viewpoints of thermal deformation resistance, weatherability, and the like that a weight ratio (a/b) in the terpolymer where (a) is a content of the repeating unit derived from a vinyl aromatic monomer and (b) is a content of repeating unit of cyclic acid anhydride is not less than 1 to less than 3. In Patent Literature 2, there is disclosed that a sum of the remaining monomer is desirably not more than 1.5% by weight relative to the copolymer, and that the copolymer is colored to yellow when an amount of maleic anhydride remaining is large. In the disclosed examples, all of the copolymers are obtained by bulk polymerization, and the sum of the remaining monomers is not less than 0.5% by weight at a minimum. Particularly, in the comparative example in which the content ratio (a/b) is less than 1, the sum of the remaining monomers is more than 3% by weight, and particularly maleic anhydride particularly tend to remain. On the other hand, in Patent Literature 3, there is disclosed the terpolymer of methyl methacrylate: 45 to 92% by mass, an aromatic vinyl compound: 5 to 30% by mass, maleic anhydride: 3 to 25% by mass. Though there is no description as to the content ratio (a/b) and effects expected from the range, there is described only the three-component copolymer having a ratio (a/b) of larger than 1, i.e. a/b=14/10 in the examples. Similarly, in Patent Literature 4, there is disclosed the three-component copolymer of methyl methacrylate: 70 to 90% by mass, an aromatic vinyl compound: 1 to 25% by mass, and maleic anhydride: 5 to 29% by mass. Though there is no description as to the weight ratio (a/b) of a content (a) of the repeating unit derived from a vinyl aromatic monomer and a content (b) of repeating unit of cyclic acid anhydride and effects expected from the range, there is described only the three-component copolymer having a ratio (a/b) of larger than 1, i.e. a/b=15/12 in the examples.

On the other hand, for example, Patent Literatures 5 to 8 disclose peripheral techniques relating to the four-component copolymer having benzyl methacrylate as the fourth monomer, of the more preferable thermoplastic acrylic resin of the present invention. Patent Literature 5 discloses a copolymer of methyl methacrylate with any one of the copolymerizable monomers such as styrene, benzyl methacrylate, and maleic anhydride. However the description directs to one of compositions which constitute a thermoplastic antistatic laminated article, and there is no description about optical properties at all. Moreover, there are no examples of the four-component copolymer corresponding to the present invention.

In Patent Literature 6, there is a description as to a copolymer containing styrenes, maleic anhydrides and methacrylate esters. Specifically, there is described that, as the metacrylate esters, methyl metacrylate and benzyl methacrylate may be copolymerized. However, there is not described an example as to the four-component copolymer composed of methyl methacrylate, styrene, benzyl methacrylate and maleic anhydride. Further there is described that a lower alkyl ester is preferable as the methacrylate esters, and there is no suggestion as to the repeating unit derived from methacrylate monomer having an aromatic group of the present invention. In addition, there is described that a preferred resin is a copolymer in which a part or the whole of maleic anhydride which is the structural unit is subjected to hydrolysis.

In Patent Literature 7, there is a description as to a copolymer containing, as a main component, a monomer selected from styrenes, maleic anhydrides and methacrylate esters. Though the monomers of methacrylate esters include methyl methacrylate and benzyl methacrylate, there are specific descriptions as to a blend of a copolymer of styrenes and methacrylate esters and a copolymer of maleic anhydrides and methacrylate esters, and a blend of a copolymer of styrenes and maleic anhydrides and a copolymer of maleic anhydrides and methacrylate esters, and there is no mention about effects obtained by copolymerizing three or more monomers at the same time. Particularly, there is no description of any example as to the four-component copolymer of the present invention. There is described that the methacrylate in the copolymer is preferably an ester of a lower alkyl ester, and there is no suggestion as to the repeating unit derived from methacrylate monomer having an aromatic group of the present invention. In addition, there is described that a preferred resin is a copolymer in which a part or the whole of maleic anhydride which is the structural unit is subjected to hydrolysis.

Further, in Patent Literature 8, there is a description as to a copolymer of maleic anhydride and acrylate. Specifically, there is described that methyl(meth)acrylate and benzyl (meth)acrylate may be used at the same time as the acrylate monomer in the copolymer, and that styrenes may be copolymerized as other monomers insofar as heat resistance is not impaired. However, there is no description of any example as to the four-component copolymer of the present invention.

CITATION LIST

Patent Literature

[Patent Literature 1] JP-B-1704667
[Patent Literature 2] JP-A-57-153008
[Patent Literature 3] JP-B-2886893
[Patent Literature 4] JP-A-05-288929
[Patent Literature 5] JP-A-08-85729
[Patent Literature 6] JP-B-3521374
[Patent Literature 7] JP-B-3711666
[Patent Literature 8] JP-A-2007-261265

Non Patent Literature

Non Patent Literature 1: KAGAKU SOUSETSU, No. 39, 1988 (published by Japan Scientific Societies Press)
Non Patent Literature 2: Monthly DESPLAY, April, 2005

SUMMARY OF INVENTION

Technical Problem

The object of the present invention is to provide a thermoplastic acrylic resin having high heat resistance and low photoelastic coefficient, and excellent in thermal stability capable of controlling the retardation by drawing, and to provide a molded article thereof.

Solution to Problem

The present invention has been made by finding the facts that the particular thermoplastic acrylic resin, especially the thermoplastic acrylic resin having the total amount of remaining monomers to 100 parts by weight of the copolymer being not more than 0.5 part by weight is excellent in thermal stability during molding process, and that the molded article thereof has remarkably high heat resistance and low photoelastic coefficient in comparison with molded articles of conventional thermoplastic acrylic resin, and can control a retardation thereof by drawing.

The present invention relates to the followings:

[1] A thermoplastic acrylic resin of a copolymer comprising 10 to 70% by weight of a repeating unit derived from a methacrylate monomer represented by the following formula (1), 5 to 40% by weight of a repeating unit derived from a vinyl aromatic monomer represented by the following formula (2), and 20 to 50% by weight of a repeating unit of a cyclic acid anhydride represented by the following formula (3) or the following formula (4), characterized in that a molar ratio (B/A) is within the range of more than 1 to not more than 10 wherein (A) is a content of the repeating unit of the vinyl aromatic monomer and (B) is a content of the repeating unit of the cyclic acid anhydride, and the total amount of remaining monomers to 100 parts by weight of the copolymer is not more than 0.5 part by weight:

[Chemical formula 1]

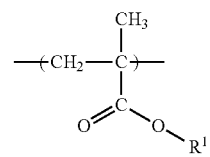

(1)

wherein $R^1$ represents hydrogen atom, a linear or branched alkyl group having 1 to 12 carbon atoms, or a cycloalkyl group having 5 to 12 carbon atoms;

[Chemical formula 2]

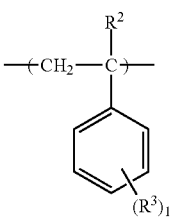

(2)

wherein $R^2$ and $R^3$ may be the same or different from each other, and represent hydrogen atom, a halogen group, a hydroxyl group, an alkoxyl group having 1 to 12 carbon atoms, a nitro group, a linear or branched alkyl group having 1 to 12 carbon atoms, and l is an integer of 1 to 3;

[Chemical formula 3]

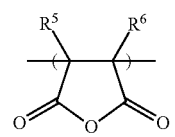

(3)

-continued

[Chemical formula 4]

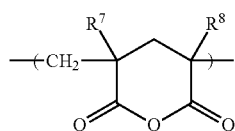
(4)

wherein $R^5$ to $R^8$ may be the same or different from each other, and represent hydrogen atom, a linear or branched alkyl group having 1 to 12 carbon atoms.

[2] The thermoplastic acrylic resin of [1], characterized by further comprising 0.1 to 5% by weight of a repeating unit derived from a methacrylate monomer having an aromatic group represented by the following formula (5):

[Chemical formula 5]

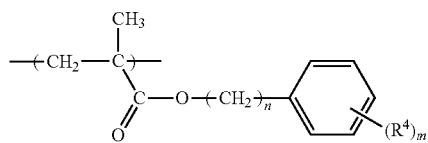
(5)

wherein $R^4$ represents hydrogen atom, a halogen group, a hydroxyl group, an alkoxyl group having 1 to 12 carbon atoms, a nitro group, a linear or branched alkyl group having 1 to 12 carbon atoms, m is an integer of 1 to 3, and n is an integer of 0 to 2.

[3] The thermoplastic acrylic resin of [1] or [2], characterized by having a weight-average molecular weight by GPC measuring method of 10,000 to 400,000, and a molecular weight distribution of 1.8 to 3.0.

[4] The thermoplastic acrylic resin of any one of [1] to [3], characterized in that the resin comprises a copolymer derived from methyl methacrylate as the repeating unit derived from the methacrylate monomer, styrene as the repeating unit derived from the vinyl aromatic monomer, maleic anhydride as the repeating unit of the cyclic acid anhydride, and benzyl methacrylate as the repeating unit derived from the methacrylate monomer having an aromatic group.

[5] The thermoplastic acrylic resin of any one of [1] to [4], which satisfies the following optical property (i):
(i) an absolute value of a photoelastic coefficient (C) being less than $2.5 \times 10^{-12}$ $Pa^{-1}$.

[6] The thermoplastic acrylic resin of any one of [1] to [5], which satisfies the following optical property (ii):
(ii) an absolute value of retardation (Re) in the in-plane direction being more than 30 nm and not more than 300 nm.

[7] The thermoplastic acrylic resin of any one of [1] to [6], characterized by satisfying the following condition (iii):
(iii) a glass transition temperature (Tg) being not less than 120° C.

[8] The thermoplastic acrylic resin of any one of [1] to [7], characterized by satisfying the following condition (iv):
(iv) a total transmittance being not less than 85%.

[9] A molded article comprising the thermoplastic acrylic resin of any one of [1] to [8].

[10] The molded article of [9], wherein the molded article is a sheet or film.

[11] The sheet or film of [10], characterized in that the sheet or film is a sheet or film molded by extrusion molding, drawn in at least one axial direction, and having a draw ratio of 0.1 to 300%.

[12] The sheet or film of [10], characterized in that the sheet or film is a sheet or film molded by cast molding, drawn in at least one axial direction, and having a draw ratio of 0.1 to 300%.

[13] A retardation plate comprising the sheet or film of any one of [10] to [12].

[14] A retardation film comprising the sheet or film of any one of [10] to [12].

[15] The thermoplastic acrylic resin of any one of [1] to [5], characterized by satisfying the following optical property (v):
(v) a value of a slope K in the equation (a) of linear relationship between birefringence ($\Delta n(S)$) after drawing and a draw ratio (S) determined by least squares approximation satisfies the following expression (b):

$$\Delta n(S) = K \times S + C \quad (a)$$

$$|K| < 0.30 \times 10^{-6} \quad (b).$$

[16] The thermoplastic acrylic resin of [15], characterized by further satisfying the following optical property (vi):
(vi) an absolute value of retardation (Re) in the in-plane direction being not more than 30 nm.

[17] The thermoplastic acrylic resin of [15] or [16], characterized by further satisfying the following optical property (vii):
(vii) an absolute value of retardation (Rth) in the thickness direction being not more than 30 nm.

[18] The thermoplastic acrylic resin of any one of [15] to [17], characterized by satisfying the following condition (viii):
(viii) a glass transition temperature (Tg) being not less than 120° C.

[19] The thermoplastic acrylic resin of any one of [15] to [18], characterized by further satisfying the following condition (ix):
(ix) a total transmittance being not less than 85%.

[20] A molded article comprising the thermoplastic acrylic resin of any one of [15] to [19].

[21] The molded article of [20], wherein the molded article is a sheet or film.

[22] The sheet or film of [21], characterized in that the sheet or film is a sheet or film molded by extrusion molding, drawn in at least one axial direction, and having a draw ratio of 0.1 to 300%.

[23] The sheet or film of [21], characterized in that the sheet or film is a sheet or film molded by cast molding, drawn in at least one axial direction, and having a draw ratio of 0.1 to 300%.

[24] A protective film for polarizing plate comprising the sheet or film of any one of [21] to [23].

[25] The molded article of [9] or [20], wherein the molded article is a lens.

[26] A transparent plastic substrate comprising the sheet or film of [10] or [21].

Advantageous Effects of Invention

According to the present invention, there can be provides the particular thermoplastic acrylic resin being excellent in thermal stability during molding process, and the molded article thereof having a high heat resistance and low photoelastic coefficient, and capable of controlling the retardation by drawing.

DESCRIPTION OF EMBODIMENTS

Thermoplastic Acrylic Resin

Preferred thermoplastic acrylic resin of the present invention is a copolymer containing 10 to 70% by weight of a repeating unit derived from a methacrylate monomer represented by the following formula (1), 5 to 40% by weight of a repeating unit derived from a vinyl aromatic monomer represented by the following formula (2), and 20 to 50% by weight of a repeating unit of a cyclic acid anhydride represented by the following formula (3) or the following formula (4):

[Chemical formula 6]

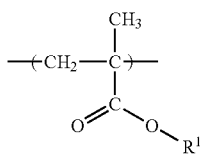
(1)

wherein $R^1$ represents hydrogen atom, a linear or branched alkyl group having 1 to 12 carbon atoms, or a cycloalkyl group having 5 to 12 carbon atoms;

[Chemical formula 7]

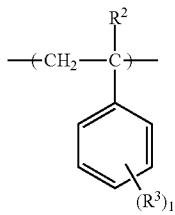
(2)

wherein $R^2$ and $R^3$ may be the same or different from each other, and represent hydrogen atom, a halogen group, a hydroxyl group, an alkoxyl group having 1 to 12 carbon atoms, a nitro group, a linear or branched alkyl group having 1 to 12 carbon atoms, and l is an integer of 1 to 3;

[Chemical formula 8]

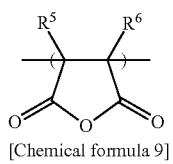
(3)

[Chemical formula 9]

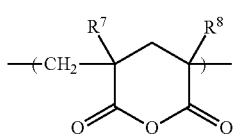
(4)

wherein $R^5$ to $R^8$ may be the same or different from each other, and represent hydrogen atom, a linear or branched alkyl group having 1 to 12 carbon atoms.

The resin is characterized in that a molar ratio (B/A) is within the range of more than 1 to not more than 10 wherein (A) is a content of the repeating unit of the vinyl aromatic monomer and (B) is a content of the repeating unit of the cyclic acid anhydride, and the total amount of remaining monomers to 100 parts by weight of the copolymer is not more than 0.5 part by weight.

More preferred thermoplastic acrylic resin of the present invention comprises a copolymer further containing 0.1 to 5% by weight of a repeating unit derived from a methacrylate monomer having an aromatic group represented by the following formula (5):

[Chemical formula 10]

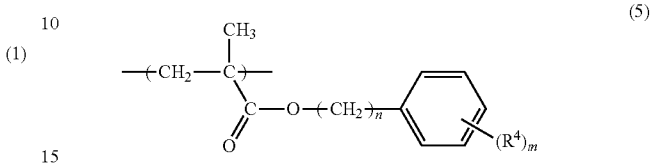
(5)

wherein $R^4$ represents hydrogen atom, a halogen group, a hydroxyl group, an alkoxyl group having 1 to 12 carbon atoms, a linear or branched alkyl group having 1 to 12 carbon atoms, m is an integer of 1 to 3, and n is an integer of 0 to 2.

In the thermoplastic acrylic resin, the repeating unit represented by the formula (1) is derived from methacrylic acid and a methacrylate ester monomer. Examples of the methacrylate ester to be used include methyl methacrylate, ethyl methacrylate, propyl methacrylate, isopropyl methacrylate, n-butyl methacrylate, isobutyl methacrylate, t-butyl methacrylate, 2-ethylhexyl methacrylate, cyclohexyl methacrylate and the like. Methacrylic acid and methacrylate ester may be used alone or in combination of two or more.

Among these methacrylate esters, preferable is an alkyl methacrylate having an alkyl group of 1 to 7 carbon atoms, and most preferable is methyl methacrylate because the obtained thermoplastic acrylic resin has excellent heat resistance and transparency.

A content of the repeating unit represented by the formula (1) is, from the viewpoint of transparency, 10 to 70% by mass, preferably 25 to 70% by mass, and more preferably 40 to 70% by mass.

The repeating unit represented by the formula (2) is derived from the aromatic vinyl monomer. Examples of the monomer to be used include styrene, 2-methyl styrene, 3-methyl styrene, 4-methyl styrene, 2,4-dimethyl styrene, 2,5-dimethyl styrene, 2-methyl-4-chlorostyrene, 2,4,6-trimethyl styrene, α-methyl styrene, cis-β-methyl styrene, trans-β-methyl styrene, 4-methyl-α-methyl styrene, 4-fluoro-α-methyl styrene, 4-chloro-α-methyl styrene, 4-bromo-α-methyl styrene, 4-t-butyl styrene, 2-fluorostyrene, 3-fluorostyrene, 4-fluorostyrene, 2,4-difluorostyrene, 2-chlorostyrene, 3-chlorostyrene, 4-chlorostyrene, 2,4-dichlorostyrene, 2,6-dichlorostyrene, 2-bromostyrene, 3-bromostyrene, 4-bromostyrene, 2,4-dibromostyrene, α-bromostyrene, β-bromostyrene, 2-hydroxystyrene, 4-hydroxystyrene, and the like. These aromatic vinyl monomers may be used alone or in combination of two or more.

Among these monomers, styrene and α-methyl styrene are preferable because of easiness of copolymerization.

A content of the repeating unit represented by the formula (2) is, from the viewpoint of transparency and heat resistance, 5 to 40% by mass, preferably 5 to 30% by mass, more preferably 5 to 20% by mass.

The cyclic acid anhydride repeating unit represented by the formula (3) is derived from an unsubstituted and/or substituted maleic anhydride. Examples of the monomer to be used include maleic anhydride, methylmaleic anhydride, dimethylmaleic anhydride, dichloromaleic anhydride, bromomaelic anhydride, dibromomaleic anhydride, phenylmaleic anhydride, diphenylmaleic anhydride, and the like. Among these monomers, maleic anhydride is preferable because of easiness of copolymerization.

The cyclic acid anhydride repeating unit represented by the formula (4) is derived by the condensation cyclization reaction between the repeating units explained herein below, and for example, glutaric acid anhydride, and the like are included.

In the thermoplastic acrylic resin of the present invention, the cyclic acid anhydride repeating unit represented by the formula (3) or (4) may possibly be ring-opened by subjecting to partial hydrolysis due to external circumstances such as humidity in the air. In the thermoplastic acrylic resin of the present invention, from the viewpoint of optical properties and heat resistance, the rate of hydrolysis is desirably less than 10% by mole, preferably less than 5% by mole, and more preferably less than 1% by mole.

Here, the rate of hydrolysis (% by mole) is calculated by the equation of {1−(amount of cyclic acid anhydride after hydrolysis (mole))/amount of cyclic acid anhydride before hydrolysis (mole)}×100.

A content of the cyclic acid anhydride repeating unit represented by the formula (3) or (4) is, in order to highly achieve the high heat resistance and optical properties (particularly controlling of retardation mentioned after) which are the effects of the present invention, 20 to 50% by mass, preferably 20 to 45% by mass. However, the molar ratio (B/A) of a content (A) of the repeating unit of the vinyl aromatic monomer represented by the formula (2) and a content (B) of the repeating unit of the cyclic acid anhydride represented by the formula (3) or (4) is more than 1 and not more than 10, preferably more than 1 and not more than 5.

The repeating unit represented by the formula (5) is derived from the methacrylate monomer having an aromatic group. Examples of the monomer to be used are phenyl methacrylate, benzyl methacrylate, 1-phenylethyl methacrylate, and the like. These monomers may be used alone or in combination of two or more. Among these monomers, particularly preferable is benzyl methacrylate.

A content of the repeating unit represented by the formula (5) is, to exhibit the optical properties (particularly minimization of photoelastic coefficient mentioned after) which are the effects of the present invention, preferably 0.1 to 5% by mass, more preferably 0.1 to 4% by mass, further preferably 0.1 to 3% by mass.

The total content of the remaining monomers (constituting the repeating units of the copolymer) of the thermoplastic acrylic resin of the present invention is not more than 0.5 part by weight, preferably not more than 0.4 part by weight, and more preferably not more than 0.3 art by weight to 100 parts by weight of the copolymer. When the total content of the remaining monomers exceeds 0.5 part by weight, there is a problem that practically unsuitable molded article can be obtained because the coloring at heating occurs during molding process, and heat resistance and weatherability of the molded article become lowered.

A weight-average molecular weight (Mw) of the thermoplastic acrylic resin of the present invention measured by GPC measuring method and in PMMA equivalent is preferably 10,000 to 400,000, more preferably 40,000 to 300,000, further preferably 70,000 to 200,000, and a molecular weight distribution (Mw/Mn) is within the range of preferably 1.8 to 3.0, more preferably 1.8 to 2.7, and further preferably 1.8 to 2.5.

A glass transition temperature (Tg) of the thermoplastic acrylic resin of the present invention can be optionally controlled by composition of the resin, and, from the viewpoint of industrial application, is controlled to be preferably not less than 120° C., more preferably not less than 130° C., and further preferably not less than 135° C.

[Polymerization Reaction]

As a polymerization method of the thermoplastic acrylic resin of the present invention, any conventional polymerization methods such as cast polymerization, bulk polymerization, suspension polymerization, solution polymerization, emulsion polymerization or anion polymerization can be employed. For optical use applications, it is preferable to avoid contamination with micro foreign materials as much as possible, and from this point of view, the cast polymerization and the solution polymerization in which any suspension agent and emulsifying agent are not used are desirable.

As a polymerization type, for instance, any one of batch polymerization method and continuous polymerization method can be employed, but the continuous polymerization system is desirable because a polymer having more uniform composition is obtained.

Temperature and polymerization time at the time of the polymerization reaction vary depending on the kind or proportion of the monomer to be used. For example, the polymerization temperature is 0 to 150° C. and the polymerization time is 0.5 to 24 hours, and preferably the polymerization temperature is 80 to 140° C. and the polymerization time is 1 to 12 hours.

When using a solvent in the polymerization reaction, examples of the polymerization solvent include an aromatic hydrocarbon solvent such as toluene, xylene or ethylbenzene; a ketone solvent such as methyl ethyl ketone or methyl isobutyl ketone; an ether solvent such as tetrahydrofuran; and the like. These solvents may be used alone or in combination of two or more. If a boiling point of the solvent to be used is too high, an amount of remaining volatile components in the thermoplastic resin for optical material finally obtained becomes large, and thus preferable is a solvent having a boiling point of 50 to 200° C.

At the time of the polymerization reaction, if necessary, a polymerization initiator may be added.

As the polymerization initiator, any initiator used in conventional radical polymerization can be used, and examples can include an organic peroxide such as cumene hydroperoxide, diisopropylbenzene hydroperoxide, di-t-butyl peroxide, lauroyl peroxide, benzoyl peroxide, t-butylperoxyisopropyl carbonate or t-amylperoxy-2-ethyl hexanoate; an azo compound such as 2,2'-azobis(isobutyronitrile), 1,1'-azobis(cyclohexanecarbonitrile), 2,2'-azobis(2,4-dimethylvaleronitrile), dimethyl-2,2'-azobisisobutylate; and the like. These polymerization initiators may be used alone or in combination of two or more.

The amount of the polymerization initiator to be used may be optionally selected depending to the combination of the monomers and the reaction conditions, and is not particularly limited, but is preferably within the range of 0.005 to 5% by weight.

A molecular weight modifier used in the polymerization reaction, if required, may be any one used in conventional radical polymerization, and particularly preferred examples include mercaptan compounds such as butyl mercaptan, octyl mercaptan, dodecyl mercaptan and 2-ethylhexyl tiogycollate. These molecular weight modifiers are added in such a concentration range that a polymerization degree is controlled within the aforementioned range.

When the polymerization is carried out, in order to inhibit gelation of polymerization reaction solution, it is preferable to control a concentration of the produced thermoplastic acrylic resin in the polymerization reaction solution so as to be not more than 50% by mass. Concretely, when a concentration of the thermoplastic acrylic resin produced in the polymerization reaction solution is beyond 50% by mass, it is preferable to control the concentration so as to be not more than 50% by mass by adding a polymerization solvent to the polymerization reaction solution, if required. The concentration of the thermoplastic acrylic resin produced in the polymerization reaction solution is more preferably not more than 45% by mass, further preferably not more than 40% by mass.

However, from the viewpoint of ensuring productivity, the concentration of the thermoplastic acrylic resin produced in the polymerization reaction solution is not less than 10% by mass, more preferably not less than 20% by mass.

The form of optionally adding the polymerization solvent to the polymerization reaction solution is not particularly limited, and the polymerization solvent may be, for example, continuously added, or the polymerization solvent may be intermittently added. As a result of controlling the concentration of the thermoplastic acrylic resin produced in the polymerization reaction solution, the gelation of the reaction solution can be sufficiently inhibited. The polymerization solvent to be added may be, for example, a solvent which is the same or different kind of the solvent used in the initial stage of the polymerization reaction. It is preferable to use a solvent which is the same kind of the solvent used in the initial stage of the polymerization reaction. The polymerization solvent to be added may be only a single solvent or a mixed solvent of two or more solvents.

[Condensation Cyclization Reaction]

In the thermoplastic acrylic resin of the present invention, the thermoplastic acrylic resin having the cyclic acid anhydride repeating unit represented by the formula (4) is prepared by the heat treatment of the thermoplastic acrylic resin having the repeating unit represented by the formula (1), the formula (2), or the formula (1), the formula (2), the formula (5).

Namely, by the heat treatment, between the repeating units represented by the formula (1) and the formula (5), the condensation cyclization reaction represented by (i) carboxyl group+carboxyl group→cyclic acid anhydride+water

[Chemical formula 11]

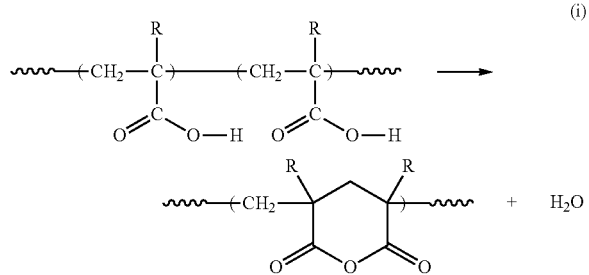

(ii) carboxyl group+ester group→cyclic acid anhydride+alcohol

[Chemical formula 12]

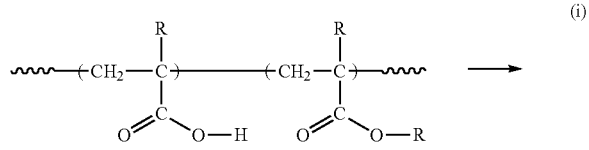

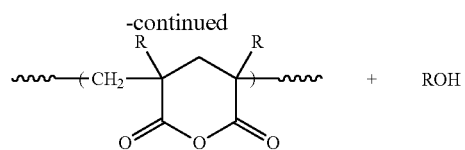

occurs to produce the cyclic acid anhydride repeating unit represented by the formula (4).

By forming the cyclic acid anhydride repeating unit, high heat resistance and desired optical properties (for instance, low photoelastic coefficient) are given to the thermoplastic acrylic resin of the present invention. When a reaction rate (%) of the condensation cyclization reaction is insufficient, the optical properties become lowered, and the heat resistance is not enhanced enough. In addition, the condensation reaction occurs in the course of the molding process by the heat treatment during the molding to generate gellation or production of water or alcohol, which gives bubbles or silver streak in the molded article.

As the methods of the heat treatment for accelerating the condensation cyclization reaction, there are included conventional known method, for example, a method in which the polymerization reaction solution containing the solvent obtained by the polymerization steps is heat-treated as it is; a method in which the heat treatment is conducted in the presence of the solvent, if necessary, in the co-presence of a ring-closing catalyst; a method in which the heat treatment is conducted by using a furnace or a reaction apparatus equipped with a vacuum apparatus or volatilizing apparatus for removing volatile components, or an extruder equipped with a volatilizing apparatus; and the like.

When the condensation cyclization reaction is carried out, if necessary, as the ring-closing catalyst, there may be used, for example, an esterification catalyst or transesterification catalyst such as p-toluenesulfonic acid; an organic carboxylic acid such as acetic acid, propionic acid, benzoic acid, acrylic acid or methacrylic acid; a basic compound, organic carboxylic acid salt and carbonate disclosed in JP-A-61-254608 and JP-A-61-261303; an organic phosphorus compound.

Examples of the organic phosphorus compound include an alkyl- (or aryl)-phosphonous acid and monoester or diester thereof such as methylphosphonous acid, ethylphosphonous acid or phenylphosphonous acid (meanwhile, these may be alkyl- (or aryl)-phosphinic acid which is a tautomer thereof); an dialkyl- (or aryl)-phosphinic acid and ester thereof such as dimethylphosphinic acid, diethylphosphinic acid, diphenylphosphinic acid, phenylmethylphosphinic acid or phenylethylphosphinic acid; an alkyl-(or aryl)-phosphonic acid and monoester or diester thereof such as methylphosphonic acid, ethylphosphonic acid, trifluoromethylphosphonic acid or phenylphosphonic acid; an alkyl-(or aryl)-phosphinous acid and ester thereof such as methylphosphinous acid, ethylphosphinous acid or phenyl phosphinous acid; a monoester, diester or triester of phosphorous acid such as methyl phosphite, ethyl phosphite, phenyl phosphite, dimethyl phosphite, diethyl phosphite, diphenyl phosphite, trimethyl phosphite, triethyl phosphite or triphenyl phosphite; a monoester, diester or triester of phosphoric acid such as methyl phosphate, ethyl phosphate, 2-ethylhexyl phosphate, isodecyl phosphate, lauryl phosphate, stearyl phosphate, isostearyl phosphate, phenyl phosphate, dimethyl phosphate, diethyl phosphate, di-2-ethylhexyl phosphate, octyl phosphate, diisodecyl phosphate, dilauryl phosphate, distearyl phosphate, diphenyl phosphate, trimethyl phosphate, triethyl phosphate, triisodecyl phosphate, trilauryl phosphate, tristearyl phosphate, triisostearyl phosphate or triphenyl phosphate; a mono-, di- or tri-alkyl- (or mono-, di- or tri-aryl)-phosphine such as methylphosphine, ethylphosphine, phenylphosphine, dimethylphosphine, diethylphosphine, diphenylphosphine, trimethylphosphine, triethylphosphine or triphenylphosphine; an alkyl-(or aryl)-phosphine halide such as methyldichlorophosphine, ethyldichlorophosphine, phenyldichlorophosphine, dimethylchlorophosphine, diethylchlorophosphine or diphenylchlorophosphine; a mono-, di- or tri-alkyl- (or mono-, di- or tri-aryl)-phosphine oxide such as methylphosphine oxide, ethylphosphine oxide, phenylphosphine oxide, dimethylphosphine oxide, diethylphosphine oxide, diphenylphosphine oxide, trimethylphosphine oxide, triethylphosphine oxide or triphenylphosphine oxide; a tetraalkyl- (or tetraaryl)-phosphonium halide such as tetramethyl phosphonium chloride, tetraethyl phosphonium chloride or tetraphenylphosphonium chloride; or the like.

These compounds may be used alone, but when two or more compounds are used at the same time, there is a case where large effects can be obtained.

The amount of the catalyst to be used in the condensation cyclization reaction relative to the thermoplastic acrylic resin is, for example, preferably 0.001 to 5% by mass, more preferably 0.01 to 2.5% by mass, further preferably 0.01 to 1% by mass, and most preferably 0.05 to 0.5% by mass. When the amount of the catalyst is less than 0.001% by mass, there is a case where the reaction rate (%) of the condensation cyclization reaction is not sufficiently improved. On the other hand, when the amount of the catalyst is more than 5% by mass, there is a case where the obtained thermoplastic acrylic resin is colored, or a case where the thermoplastic acrylic resin is crosslinked to thereby become difficult to be melt-molded.

The timing of the addition of the catalyst is not particularly limited, and may be added at the initial stage of the reaction, may be added in the course of the reaction, or may be added at both timings.

The condensation cyclization reaction is preferably carried out in the presence of the solvent, and a volatilizing process is also conducted at the condensation cyclization reaction. In such a case, because the water or alcohol obtained as a by-product by the condensation cyclization reaction is forced to be removed through volatilization, the reaction equilibrium occurs advantageously at the production side of the condensation cyclic product.

[Volatilization Process]

The volatilization process means a process to remove, if necessary under reduced pressure with heating, (i) volatile components such as the polymerization solvent and remaining monomers, and/or (ii) water or alcohol obtained as a by-product by the condensation cyclization reaction. When the removal treatment is not sufficiently conducted, the amount of the remaining volatile components in the obtained thermoplastic acrylic resin becomes larger, which results in coloring due to deterioration at the time of molding and the molding failures such as bubbles and silver streak. The amount of the remaining volatile components is desirably not more than 1.0 part by weight, preferably not more than 0.7 part by weight, and more preferably not more than 0.5 part by weight to 100 parts by weight of the thermoplastic acrylic resin. The amount of the remaining volatile components of the present invention means the total amount of the aforementioned unreacted remaining monomers at the time of polymerization reaction, the polymerization solvent, the by-product water and the by-product alcohol.

As an apparatus to be used in the volatilization process, there may be used for example a volatilizing apparatus composed of a heat exchanger and volatilizing tank; an extruder with vent; an apparatus provided with a volatilizing apparatus and an extruder in series, and the like. When the extruder with vent is used, the number of the vents may be one or plural, and the extruder preferably has plural vents.

The reaction-treatment temperature is preferably 150 to 350° C., more preferably 200 to 300° C. When the temperature of the reaction treatment is lower than 150° C., there is a case where the cyclization condensation reaction is insufficient to thereby make the remaining volatile component large. On the other hand, when the temperature of the reaction treatment is higher than 350° C., there is a case where the obtained thermoplastic acrylic resin is colored and decomposed.

The reaction-treatment pressure is preferably 931 to 1.33 hPa (700 to 1 mmHg), more preferably 798 to 66.5 hPa (600 to 50 mmHg). When the pressure of the reaction treatment is higher than 931 hPa (700 mmHg), there is a case where the volatile component including water or alcohol easily remains. On the other hand, when the pressure of the reaction treatment is lower than 1.33 hPa (1 mmHg), there is a case where industrial production is difficult.

The reaction-treatment time is optionally selected depending on the condensation cyclization rate and the amount of the remaining volatile components, and is preferably as short as possible in order to inhibit coloring and decomposition of the obtained thermoplastic acrylic resin.

However, when the reaction conversion rate of the monomers is low at the polymerization reaction, the unreacted monomers remain in a large amount. In such a case, in order to reduce the amount of the remaining volatile components, the resin needs to be treated at a high treatment temperature for a long time, which arises problems of remarkable coloring and decomposition of the obtained thermoplastic acrylic resin. When the resulting polymerization reaction solution contains a large amount of the unreacted monomers, the monomers in question can be separated from the polymerization reaction solution by, after the addition of, for example, an aromatic hydrocarbon solvent, a hydrocarbon solvent or an alcohol solvent, by subjecting to homogenizer treatment (emulsification/dispersion), and by subjecting the unreacted monomers to pre-treatment of liquid-liquid extraction, or solid-liquid extraction. Then, by volatilizing the polymerization reaction solution after separating the monomers, the total amount of the monomers remaining in 100 parts by weight of the thermoplastic acrylic resin can be suppressed to be not more than 0.5 part by weight.

The number of the foreign materials contained in the thermoplastic acrylic resin of the present invention is preferably as small as possible for optical use. As a method of reducing the number of the foreign materials, there is a method in which, in the polymerization reaction process, condensation cyclization reaction process, the volatilization process and the molding process, the solution or melt of the thermoplastic acrylic resin is filtered by a leaf-disc polymer filter of filtration accuracy of 1.5 to 15 μm.

[Molded Article and Composition]

When molding the thermoplastic acrylic resin of the present invention to a molded article, for example, a sheet or film, a method of extrusion molding, cast molding, or the like is used. For example, an undrawn sheet or film can be molded by using an extruder, or the like equipped with a T-die, round-die, or the like. At the time of the extrusion molding, the molding can also be carried out by melt-kneading various additives and resins other than the thermoplastic acrylic resin of the present invention.

Alternatively, an undrawn sheet or film can be cast-molded by dissolving the thermoplastic acrylic resin of the present invention in a solvent such as chloroform or methylene dichloride, and carrying out cast drying/solidification. According to the present invention, the sheet means one having a thickness of more than 300 μm. Meanwhile, the film has a thickness of not more than 300 μm, and desirably has a thickness of preferably not less than 1 μm, further preferably not less than 5 μm.

In the present invention, the drawing may be carried out continuously after the extrusion molding, cast molding. For example, in case of a film, the undrawn film can be longitudinally uniaxially drawn in the mechanical flow direction, or can be transversely uniaxially drawn in the direction perpendicular to the mechanical flow direction. A biaxially drawn film can be prepared by a biaxial drawing method such as sequential biaxial drawing by roll drawing and tenter drawing, simultaneous biaxial drawing by tenter drawing, or biaxial drawing by tubular drawing. By the drawing, the strength of the film can be increased.

The final draw ratio can be determined from the heat shrinkage rate of the obtained molded article. The draw ratio is preferably not less than 0.1% and not more than 300% at least in either direction, more preferably not less than 0.2% and not more than 290%, particularly preferably not less than 0.3% and not more than 280%. By setting within the range, a preferable molded article can be obtained from the viewpoints of birefringence, heat resistance, and strength.

In the present invention, in the case where the molded article is a film, in order to stabilize its optical isotropy and mechanical properties, heat treatment (annealing) can be carried out after the drawing treatment.

The condition of the heat treatment is not particularly limited, and may be optionally selected in the same manner as that applied to the conventionally known drawn film.

The molded article, for example, sheet or film composed of the thermoplastic acrylic resin of the present invention, may contain various additives within a range in which the effects of the present invention are not remarkably impaired. The kind of the additives is not particularly limited as long as it is generally used for the blending of resins and rubber-like polymers.

Examples include inorganic fillers, pigments such as iron oxide, lubricating agents such as stearic acid, behenic acid, zinc stearate, calcium stearate, magnesium stearate and ethylene-bisstearoamide, mold-releasing agents, softening agents or plasticizers such as paraffin process oil, naphthene process oil, aromatic process oil, paraffine, organic polysiloxane and mineral oil, antioxidants such as hindered phenol antioxidant and phosphorus heat stabilizer, hindered amine light stabilizer, benzotriazole ultraviolet-absorbing agents, flame retardants, antistatic agents, reinforcing agents such as organic fibers, glass fibers, carbon fibers and metal whiskers, coloring agents, other additives, and mixture thereof.

The content ratio of the additives is preferably 0 to 5% by mass, more preferably 0 to 2% by mass, and further preferably 0 to 1% by mass.

To the molded article, for example, sheet or film composed of the thermoplastic acrylic resin of the present invention, there can be blended within a range in which the object of the present invention is not impaired, for example, at least one of thermoplastic resins including a polyolefin-based resin such as polyethylene or polypropylene; a styrene-based resin such as polystyrene, styrene/acrylonitrile copolymer, styrene/maleic anhydride or styrene/methacrylic acid copolymer; a polymethacrylate ester-based resin; a polyamide; a polyphenylenesulfide resin; a polyether ether ketone resin; a polyester-based resin; polysulfone; polyphenylene oxide; polyimide; polyether imide; polyacetal; a cyclic olefin-based resin and a norbornene-based resin; a cellulose resin such as triacetylcellulose, thermosetting resins such as a phenol resin; a melamine resin; a silicone resin and an epoxy resin, and the like.

The molded article, for example, sheet or film of the present invention may also be subjected to surface functionalization treatments such as antireflection treatment, transparent electroconductive treatment, electromagnetic-wave shielding treatment and gas barrier treatment.

The thermoplastic acrylic resin of the present invention is preferably used as molded articles such as a display panel, lens, a transparent substrate used for a solar cell. In addition, the resin can be used as molded articles such as a waveguide, lens, an optical fiber, a coating material of optical fiber, lens of LED or a lens cover in fields of an optical communication system, an optical switching system, an optical measurement system, and the like.

[Optical Film]

The film composed of the thermoplastic acrylic resin of the present invention can be used as an optical film. As the optical film, from the viewpoint of an industrial application, applications exist where birefringence is required as its optical property and where birefringence is not required. Applications where birefringence is required are, for example, a retardation plate, a retardation film (optical film A), and an application where birefringence is not required is, for example, a polarizer protective film (optical film B).

(a) Optical Film A

The optical film A composed of the thermoplastic acrylic resin of the present invention satisfies the following optical property (i).

(i) An absolute value of a photoelastic coefficient is less than $2.5 \times 10^{-12}\,\text{Pa}^{-1}$. Preferably, the following optical property (ii) is satisfied.

(ii) An absolute value of retardation (Re) in the in-plane direction is more than 30 nm and not more than 300 nm.

Further, the following condition (iii) is satisfied.

(iii) A glass transition temperature (Tg) is not less than 120° C.

Further preferably, the following condition (iv) is satisfied.

(iv) A total transmittance is not less than 85%.

The absolute value of the photoelastic coefficient (C) of the optical film A composed of the thermoplastic acrylic resin of the present invention is preferably less than $2.5 \times 10^{-12}\,\text{Pa}^{-1}$, more preferably not more than $2.0 \times 10^{-12}\,\text{Pa}^{-1}$, and further preferably not more than $1.0 \times 10^{-12}\,\text{Pa}^{-1}$.

With respect to the photoelastic coefficient, there are described various literatures (for instance, referring to KAGAKU SOUSETSU, No. 39, 1988 (published by Japan Scientific Societies Press), and the photoelastic coefficient is defined by the following equation.

$$C_R = |\Delta_n|/\sigma_R$$

$$|\Delta_n| = nx - ny$$

wherein $C_R$: photoelastic coefficient, $\sigma_R$: extensional stress, $|\Delta_n|$: absolute value of birefringence, nx: refraction index in the stretched direction, and ny: refraction index in the direction perpendicular to the stretched direction.

It is shown that when the value of the photoelastic coefficient becomes close to zero, the change of birefringence by an external force is small, which means that the change of birefringence designed for various applications is small.

The birefringence required in the optical film A, in the case of a retardation film, by the requirement from liquid crystal mode to be applied, the absolute value of retardation (Re) in the in-plane direction is designed in the range of more than 30 nm and not more than 300 nm. For example, in the case of a ¼ wavelength plate, the required absolute value of the retardation (Re) is not less than 100 nm and not more than 180 nm, preferably not less than 120 nm and not more than 160 nm, and more preferably not less than 130 nm and not more than 150 nm. In the case of a ½ wavelength plate, the required absolute value of the retardation (Re) is not less than 240 nm and not more than 320 nm, preferably not less than 260 nm and not more than 300 nm, and more preferably not less than 270 nm and not more than 290 nm.

The birefringence of the optical film A is controlled by (i) a method of controlling the composition of the thermoplastic acrylic resin of the present invention, (ii) a method of controlling the orientation of the polymer chains by drawing after molding, and further the combination of the methods (i) and (ii).

In general, there are cases where the drawing is conducted in order to not only control the birefringence but also increase mechanical strength of the film. Whether any of giving birefringence or giving mechanical strength is intended, a material which will greatly change its birefringence with a little drawing may result in a problem that the controlling of the required retardation is difficult.

The glass transition temperature (Tg) of the optical film A composed of the thermoplastic acrylic resin of the present invention is preferably not less than 120° C., more preferably not less than 130° C., and further preferably not less than 135° C. When the glass transition temperature is less than 120° C., there are cases where the film can not be used for an application in which a high heat resistance is required, because dimensional stability is inferior under an environmental temperature to be used.

The total transmittance of the optical film A composed of the thermoplastic acrylic resin of the present invention is preferably not less than 85%, more preferably not less than 88%, and further preferably not less than 90%. When the total transmittance is less than 85%, there are cases where the film can not be used for an application in which a high transparency is required because of the lowering of transparency.

The optical film A composed of the thermoplastic acrylic resin of the present invention is characterized in that the film has remarkably high heat resistance and low photoelastic coefficient in comparison with films composed of the conventional thermoplastic acrylic resins, and can easily control the retardation by drawing.

The optical film A composed of the thermoplastic acrylic resin of the present invention is suitable for applications in which birefringence is mainly required, such as a retardation film (concretely, a liquid crystal optical compensation film such as a view field angle control film used for various liquid crystal modes such as TN, VA, IPS, and OCB), a retarder such as a ¼ wavelength plate or a ½ wavelength plate.

(b) Optical Film B

The optical film B is an optical film prepared by molding the thermoplastic acrylic resin of the present invention, and satisfies the following optical property (i).

(i) An absolute value of a photoelastic coefficient (C) is less than $2.5 \times 10^{-12}$ $Pa^{-1}$.

Furthermore, the following optical property (ii) is preferably satisfied.

(ii) A value of a slope K in the equation (a) of linear relationship between birefringence ($\Delta n(S)$) after drawing and a draw ratio (S) determined by least squares approximation satisfies the following expression (b):

$$\Delta n(S) = K \times S + C \tag{a}$$

$$|K| < 0.30 \times 10^{-6} \tag{b}$$

Further, the following optical property (iii) is preferably satisfied.

(iii) An absolute value of retardation (Re) in the in-plane direction is not more than 30 nm.

Further, the following optical property (iv) is preferably satisfied.

(iv) an absolute value of retardation (Rth) in the thickness direction is not more than 30 nm.

Further, the optical property (v) is preferably satisfied.

(v) A ratio (Rth/Re) of the retardation (Re) in the in-plane direction and the retardation (Rth) in the thickness direction satisfies the following equation (c).

$$0.1 < Rth/Re < 1 \tag{c}$$

Further, the following optical property (vi) is preferably satisfied.

(vi) A glass transition temperature (Tg) is not less than 120° C.

Further, the following optical property (vii) is preferably satisfied.

(vii) A total transmittance is not less than 85%.

The absolute value of the photoelastic coefficient (C) of the optical film B composed of the thermoplastic acrylic resin of the present invention is preferably not more than $2.5 \times 10^{-12}$ $Pa^{-1}$, more preferably not more than $2.0 \times 10^{-12}$ $Pa^{-1}$, and further preferably not more than $1.0 \times 10^{-12}$ $Pa^{-1}$.

With respect to the photoelastic coefficient, there are described various literatures (for instance, referring to KAGAKU SOUSETSU, No. 39, 1998 (published by Japan Scientific Societies Press), and the photoelastic coefficient is defined by the following equation.

$$C_R = |\Delta_n|/\sigma_R$$

$$|\Delta_n| = nx - ny$$

wherein $C_R$: photoelastic coefficient, $\sigma_R$: extensional stress, $|\Delta_n|$: absolute value of birefringence, nx: refraction index in the stretched direction, and ny: refraction index in the direction perpendicular to the stretched direction.

It is shown that when the value of the photoelastic coefficient becomes close to zero, the change of birefringence by an external force is small, which means that the change of birefringence designed for various applications is small.

In the case of industrial use, though the drawing of a film is preferably carried out in order to enhance its mechanical strength, there is a danger of increasing its birefringence due to the orientation caused by the drawing.

According to the optical film B composed of the thermoplastic acrylic resin of the present invention, a value of a slope K in the equation (a) of linear relationship between birefringence ($\Delta n(S)$) after drawing and a draw ratio (S) determined by least squares approximation satisfies the following expression (b):

$$\Delta n(S) = K \times S + C \tag{a}$$

$$|K| < 0.30 \times 10^{-6} \tag{b}$$

The value of slope K represents an increasing amount of birefringence ($\Delta n(S)$) relative to a draw ratio (S). It is meant that when K is larger, an increasing amount of birefringence relative to the drawing is larger, and when K is smaller, an increasing amount of birefringence relative to the drawing is smaller.

A preferred range of the value of K of the optical film B composed of the thermoplastic acrylic resin of the present invention is $|K| < 0.30 \times 10^{-6}$, preferably $|K| < 0.15 \times 10^{-6}$, and more preferably $|K| < 0.10 \times 10^{-6}$.

Here, the value of K is a value obtained by conducting drawing at a drawing speed of 500 mm/min. at a drawing temperature of (Tg+20)° C. in which the glass transition temperature (Tg) of the thermoplastic resin is measured by DSC method. It is generally known that when drawing speed becomes slower, a degree of increase of birefringence becomes smaller. The value of K can be calculated through a least squares approximation from values of birefringence (Δn (S)) obtained by drawing at draw ratios (S) of 100 times, 200 times and 300 times. The draw ratio (S) is a value represented by the following equation, in which a distance between chucks before drawing is assumed to be $L_0$, and a distance between chucks after drawing is assumed to be $L_1$.

$$S = \frac{L_1 - L_0}{L_0} \times 100 \, (\%) \qquad \text{[Equation 1]}$$

The absolute value of the retardation (Re) per 100 μm thickness in the in-plane direction of the optical film B composed of the thermoplastic acrylic resin of the present invention is not more than 30 nm, preferably not more than 20 nm, more preferably not more than 15 nm, and particularly preferably not more than 11 nm. The absolute value of the retardation is an index which represents a degree of birefringence. Accordingly, the birefringence of the optical film B composed of the thermoplastic acrylic resin of the present invention is small. On the other hand, when the retardation in the in-plane direction per 100 μm thickness is more than 30 nm, anisotropy of refractive index is high, and there is a case where the film can not be used for an application requiring a low birefringence.

In general, it is known that a retardation of an optical film composed of a thermoplastic resin increases by drawing. For example, there is a case where drawing processing is conducted in order to increase mechanical strength of an optical film. In such a case, however, when a retardation in the in-plane direction per 100 μm thickness of the obtained drawn optical film is more than 30 nm, it is not considered to have obtained a film having a low birefringence.

The absolute value of the retardation (Rth) per 100 μm thickness in the thickness direction of the optical film B composed of the thermoplastic acrylic resin of the present invention is not more than 30 nm, preferably not more than 20 nm, more preferably not more than 15 nm, and particularly preferably not more than 11 nm. The retardation in the thickness direction is an index, for example, correlating with view field angle property of display device equipped with an optical film. Concretely, smaller the absolute value of the retardation in the thickness direction is, more preferable the view field angle is, and thus the color tone change and contrast decrease are small if looked at from different angle. The absolute value of the retardation (Rth) in the thickness direction of the optical film is small.

The glass transition temperature (Tg) of the optical film B is preferably not less than 120° C., more preferably not less than 130° C., and further preferably not less than 135° C. When the glass transition temperature is less than 120° C., there is a case where the film can not be used for an application requiring a high heat resistance because dimensional stability is inferior under an environmental temperature to be used.

The total transmittance of the optical film B is preferably not less than 85%, more preferably not less than 88%, and further preferably 90%. When the total transmittance is less than 85%, there is a case where the film can not be used for an application requiring a high transparency because of the lowering of transparency.

The optical properties of the optical film B composed of the thermoplastic acrylic resin of the present invention are characterized by the remarkably low (approximately zero) birefringence both in the in-plane direction of the film and in the thickness direction of the film, and the remarkably small (approximately zero) photoelastic coefficient, and thus the perfect optical isotropy which cannot be achieved by conventionally known resins is realized. Further, a high heat resistance is also realized.

The optical film B composed of the thermoplastic acrylic resin of the present invention is suitable for the applications which do not require birefringence mainly such as a protective film of polarizing plate.

EXAMPLE

In the following, the present invention will be more specifically explained by referring to EXAMPLE.

The measuring method of each measurement value used in the present invention is as follows:

(a) Analysis of Thermoplastic Resin (1) Repeating Unit

By $^1$H-NMR measurement, identification and calculation of its amount were carried out with respect to (i) the repeating unit derived from the methacrylate monomer, (ii) the repeating unit derived from the vinyl aromatic monomer, (iii) the repeating unit derived from the methacrylate monomer having an aromatic group, and (iv) the repeating unit of the acid anhydride.

Measuring apparatus: DPX-400 manufactured by Bruker Japan. Co., Ltd.

Measuring solvent: $CDCl_3$ or $d^6$-DMSO

Measuring temperature: 40° C.

(2) Glass Transition Temperature

The glass transition temperature (Tg) was calculated according to middle point method from a DSC curve obtained by using a differential scanning calorimeter (Diamond DSC manufactured by PerkinElmer Japan Co., Ltd.), and heating about 10 mg of a sample, according to JIS-K-7121, at a temperature rising rate of 10° C./min. from a normal temperature to 200° C. under a nitrogen gas atmosphere through the reference of α-alumina.

(3) Molecular Weight

The weight-average molecular weight and the number-average molecular weight were obtained by using a gel permeation chromatograph (HLC-8220 manufactured by TOSO Co., Ltd.) at a temperature of 40° C. with tetrahydrofuran as a solvent, and by the calculation on the basis of a commercially available standard PMMA.

(b) Evaluation of Optical Properties (1) Preparation of an Optical Film Sample (a) Molding of a Pressed Film A pressed film was molded by using a vacuum compression molding machine (SFV-30 Type manufactured by SHINTO Metal Industries Corporation), pre-heating under an atmospheric pressure for 25 minutes at 260° C., and compressing under a vacuum (about 10 kPa) at 260° C. by applying the pressure of about 10 MPa for 5 minutes.

(b) Molding of a Drawn Film

A drawn film was molded by using a tensile testing machine of 5 t manufactured by Instron, and subjecting to uniaxial free drawing at a drawing temperature of (Tg+20)° C. and at a drawing speed of 500 mm/min. The draw ratio was 100%, 200% and 300%.

(2) Measurement Of Birefringence

The measurement was conducted by using RETS-100 manufactured by Otsuka Electronics Co., Ltd. according to rotation analyzer method. The value of birefringence is a value by using a light having a wavelength of 550 nm. The birefringence (Δn) was calculated according to the following equation.

$$\Delta n = nx - ny$$

wherein Δn: birefringence, nx: refraction index in the stretched direction, and ny: refraction index in the direction perpendicular to the stretched direction.

The absolute value (|Δn|) of birefringence (Δn) was calculated according to the following.

$$|\Delta n| = |nx - ny|$$

(3) Measurement of Retardation
<Retardation of In-Plane Direction>

The measurement was conducted within the range of 400 to 800 nm by using RETS-100 manufactured by Otsuka Electronics Co., Ltd. according to rotation analyzer method.

The relation between the absolute value of birefringence (|Δn|) and the retardation (Re) is as follows:

$$Re = |\Delta n| \times d$$

wherein |Δn|: absolute value of birefringence, Re: retardation, and d: thickness of sample.

The absolute value of birefringence (|Δn|) is a value shown in the following.

$$|\Delta n| = |nx - ny|$$

wherein nx: refraction index in the stretched direction, and ny: refraction index in the direction perpendicular to the stretched direction in-plane.

<Retardation in the Thickness Direction>

A retardation was measured by using a retardation measuring machine (KOBRA-21ADH) manufactured by Oji Scientific Instruments, measuring a retardation at a wavelength of 589 nm, and calculating the obtained value on the basis of a film thickness of 100 μm.

The relation between the absolute value of birefringence (|Δn|) and the retardation (Rth) is as follows:

$$Rth = |\Delta n| \times d$$

wherein |Δn|: absolute value of birefringence, and Rth: retardation, d: thickness of sample.

The absolute value of birefringence (|Δn|) is a value shown in the following.

$$|\Delta n| = |(nx + ny)/2 - nz|$$

wherein nx: refraction index in the stretched direction, ny: refraction index in the direction perpendicular to the stretched direction in plane, and nz: refraction index in the thickness direction perpendicular to the stretched direction out of plane. (In the ideal film having perfect isotropy in the three dimensional directions, a retardation of in-plane direction (Re) and a retardation in the thickness direction (Rth) are both zero.)

(4) Measurement of Photoelastic Coefficient

The birefringence measuring device described in detail in Polymer Engineering and Science 1999, 39, 2349-2357 was used. A birefringence was measured by placing a tensile device of a film in the course of a laser beam and applying a tension stress at 23° C. The measurement was carried out at a strain rate at the stretching of 50%/min (distance between chucks: 50 mm, movement speed of chuck: 5 mm/min.) and a width of the test piece of 6 mm. From the relation between the absolute value of the birefringence (|Δn|) and the tension stress ($\sigma_R$), a slope of the straight line was determined through a least squares approximation, and then a photoelastic coefficient ($C_R$) was calculated. In the calculation, data of a tension stress between 2.5 MPa ≤ $\sigma_R$ ≤ 10 MPa were used.

$$C_R = |\Delta n|/\sigma_R$$

$$|\Delta n| = |nx - ny|$$

wherein $C_R$: photoelastic coefficient, $\sigma_R$: extensional stress, |Δn|: absolute value of birefringence, nx: refraction index in the stretched direction, and ny: refraction index in the direction perpendicular to the stretched direction.

Thermoplastic Acrylic Resin

Methyl methacrylate/styrene/maleic anhydride

Example 1

A glass reactor (1 L volume) with a jacket equipped with a stirrer, a temperature sensor, a cooling tube, a nitrogen gas introducing nozzle, a starting solution introducing nozzle, an initiator solution introducing nozzle and a polymer solution discharging nozzle was used. A pressure of the polymerization reactor was slightly increased, and a reaction temperature was controlled at 100° C.

A starting solution was prepared by mixing 518 g of methyl methacrylate (MMA), 48 g of styrene (St), 384 g of maleic anhydride (MAH), 240 g of ethylbenzene, 1.2 g of n-octyl mercaptane, and then replacing air in the reactor with nitrogen gas. An initiator solution was prepared by dissolving 0.364 g of 2,2'-azobis(isobutylonitrile) in 12.96 g of ethylbenzene, and then replacing air in the reactor with nitrogen gas.

The starting solution was introduced through the starting solution introducing nozzle at 6.98 ml/min. by using a pump. Furthermore, the initiator solution was introduced through the initiator solution introducing nozzle at 0.08 ml/min. by using a pump. After 30 minutes, a polymer solution was discharged from the polymer solution discharging nozzle at a constant flow rate of 425 ml/hr by using a discharging pump.

The polymer solution obtained during 1.5 hours after the discharge was separately collected in an initial discharge tank. The polymer solution obtained during 1.5 to 2.5 hours after the start of the discharge was mainly collected. The obtained polymer solution and methanol as an extraction solvent were supplied to a homogenizer at the same time to be subjected to emulsion dispersion and extraction. The separated and precipitated polymer was collected, and the collected polymer was dried under vacuum for 2 hours at 130° C. to obtain the desired thermoplastic acrylic resin.

Composition: MMA/St/MAH=54/23/22 wt % (mole ratio: B/A>1)
Molecular weight: Mw=15.1×10$^4$; Mw/Mn=1.94
Tg: 145° C.

Example 2

The same procedures as in EXAMPLE 1 were repeated except that, different from EXAMPLE 1, 576 g of methyl methacrylate, 96 g of styrene, 288 g of maleic anhydride were used to obtain a thermoplastic acrylic resin.

Composition: MMA/St/MAH=58/19/23 wt % (mole ratio: B/A>1)
Molecular weight: Mw=19.7×10$^4$; Mw/Mn=2.16
Tg: 144° C.

Example 3

The same procedures as in EXAMPLE 1 were repeated except that, the same as in EXAMPLE 1, 518 g of methyl methacrylate, 48 g of styrene, 384 g of maleic acid anhydride were used to obtain a thermoplastic acrylic resin.
Composition: MMA/St/MAH=61/11/27 wt % (mole ratio: B/A>1)
Molecular weight: Mw=19.5×10$^4$; Mw/Mn=2.23
Tg: 141° C.

Methyl methacrylate/styrene/maleic anhydride/benzyl methacrylate

Example 4

A glass reactor (1 L volume) with a jacket equipped with a stirrer, a temperature sensor, a cooling tube, a nitrogen gas introducing nozzle, a starting solution introducing nozzle, an initiator solution introducing nozzle and a polymer solution discharging nozzle was used. A pressure of the polymerization reactor was slightly increased, and a reaction temperature was controlled at 100° C.

A starting solution was prepared by mixing 518 g of methyl methacrylate (MMA), 115 g of styrene (St), 19.2 g of benzyl methacrylate (BzMA), 307 g of maleic anhydride (MAH), 240 g of methyl isobutyl ketone, 1.2 g of n-octyl mercaptane, and then replacing them air in the reactor nitrogen gas. An initiator solution was prepared by dissolving 0.364 g of 2,2'-azobis(isobutylonitrile) in 12.96 g of ethylbenzene, and then replacing air in the reactor with nitrogen gas.

The starting solution was introduced through the starting solution introducing nozzle at 6.98 ml/min. by using a pump. Furthermore, the initiator solution was introduced through the initiator solution introducing nozzle at 0.08 ml/min. by using a pump. After 30 minutes, a polymer solution was discharged from the polymer solution discharging nozzle at a constant flow rate of 425 ml/hr by using a discharging pump.

The polymer solution obtained during 1.5 hours after the discharge was separately collected in an initial discharge tank. The polymer solution obtained during 1.5 to 2.5 hours after the start of the discharge was mainly collected. The obtained polymer solution and methanol as an extraction solvent were supplied to a homogenizer at the same time to be subjected to emulsion dispersion and extraction. The separated and precipitated polymer was collected, and the collected polymer was dried under vacuum for 2 hours at 130° C. to obtain the desired thermoplastic acrylic resin.
Composition: MMA/St/MAH/BzMA=55/20/24/1 wt % (mole ratio: B/A>1)
Molecular weight: Mw=16.2×10$^4$; Mw/Mn=1.99
Tg: 143° C.

Example 5

The same procedures as in EXAMPLE 3 were repeated except that, different from EXAMPLE 4, 557 g of methyl methacrylate, 96 g of styrene, 19.2 g of benzyl methacrylate, 288 g of maleic acid anhydride were used to obtain a thermoplastic acrylic resin.
Composition: MMA/St/MAH/BzMA=50/20/29/1 wt % (mole ratio: B/A>1)
Molecular weight: Mw=19.0×10$^4$; Mw/Mn=2.23
Tg: 143° C.

Methyl methacrylate/styrene/methacrylic acid/glutaric acid anhydride

Example 6

A glass reactor (1 L volume) with a jacket equipped with a stirrer, a temperature sensor, a cooling tube, a nitrogen gas introducing nozzle, a starting solution introducing nozzle, an initiator solution introducing nozzle and a polymer solution discharging nozzle was used. A pressure of the polymerization reactor was slightly increased, and a reaction temperature was controlled at 100° C.

A starting solution was prepared by mixing 288 g of methyl methacrylate, 96 g of styrene, 576 g of methacrylic acid (MAA), 240 g of m-xylene, 1.2 g of n-octyl mercaptane, and then replacing air in the reactor with nitrogen gas. An initiator solution was prepared by diluting 0.08 g of 75 wt % ethylbenzene solution of 1,1-di(t-butylperoxy)cyclohexane by 12.96 g of ethylbenzene, and then replacing air in the reactor with nitrogen gas.

The starting solution was introduced through the starting solution introducing nozzle at 6.98 ml/min. by using a pump. Furthermore, the initiator solution was introduced through the initiator solution introducing nozzle at 0.08 ml/min. by using a pump. After 30 minutes, a polymer solution was discharged from the polymer solution discharging nozzle at a constant flow rate of 425 ml/hr by using a discharging pump.

The polymer solution obtained during 1.5 hours after the discharge was separately collected in an initial discharge tank. The polymer solution obtained during 1.5 to 2.5 hours after the start of the discharge was mainly collected. The obtained polymer solution and methanol as an extraction solvent were supplied to a homogenizer at the same time to be subjected to emulsion dispersion and extraction. The separated and precipitated polymer was collected, and the collected polymer was dried under vacuum for 2 hours at 130° C. to obtain a precursor. The precursor was subjected to heat treatment by using a laboprast mill with a volatilizing apparatus (treatment temperature: 250° C., degree of vacuum: 133 hPa (100 mmHg)) to obtain the desired thermoplastic acrylic resin.
Composition: MMA/St/MAA/Glutaric acid anhydride=37/12/10/41 wt % (mole ratio: B/A>1)
Molecular weight: Mw=26.7×10$^4$; Mw/Mn=2.65
Tg: 157° C.

Methyl methacrylate/styrene/methacrylic acid/glutaric acid anhydride/benzyl methacrylate

Example 7

A glass reactor (1 L volume) with a jacket equipped with a stirrer, a temperature sensor, a cooling tube, a nitrogen gas introducing nozzle, a starting solution introducing nozzle, an initiator solution introducing nozzle and a polymer solution discharging nozzle was used. A pressure of the polymerization reactor was slightly increased, and a reaction temperature was controlled at 100° C.

A starting solution was prepared by mixing 605 g of methyl methacrylate, 67 g of styrene, 48 g of benzyl methacrylate, 240 g of methacrylic acid (MAA), 240 g of methyl isobutyl ketone, 1.2 g of n-octyl mercaptane, and then replacing air in the reactor with nitrogen gas. An initiator solution was prepared by dissolving 0.364 g of 2,2'-azobis(isobutylonitrile) in 12.96 g of methyl isobutyl ketone, and then replacing air in the reactor with nitrogen gas.

The starting solution was introduced through the starting solution introducing nozzle at 6.98 ml/min. by using a pump. Furthermore, the initiator solution was introduced through the initiator solution introducing nozzle at 0.08 ml/min. by using a pump. After 30 minutes, a polymer solution was discharged from the polymer solution discharging nozzle at a constant flow rate of 425 ml/hr by using a discharging pump.

The polymer solution obtained during 1.5 hours after the discharge was separately collected in an initial discharge tank. The polymer solution obtained during 1.5 to 2.5 hours after the start of the discharge was mainly collected. The obtained polymer solution and methanol as an extraction solvent were supplied to a homogenizer at the same time to be subjected to emulsion dispersion and extraction. The separated and precipitated polymer was collected, and the collected polymer was dried under vacuum for 2 hours at 130° C. to obtain a precursor. The precursor was subjected to heat treatment by using a laboprast mill with a volatilizing apparatus (treatment temperature: 250° C., degree of vacuum: 133 hPa (100 mmHg)) to obtain the desired thermoplastic acrylic resin.

Composition: MMA/St/MAA/Glutaric acid anhydride/BzMA=59/9/4/4/24 wt % (mole ratio: B/A>1)
Molecular weight: Mw=11×10$^4$; Mw/Mn=2.35
Tg: 131° C.

Comparative Example 1

The same procedures as in EXAMPLE 1 were repeated except that, different from EXAMPLE 1, 960 g of methyl methacrylate was used to obtain a thermoplastic acrylic resin.
Composition: MMA=100 wt %
Molecular weight: Mw=10×10$^4$; Mw/Mn=1.89
Tg: 121° C.

Comparative Example 2

The same procedures as in EXAMPLE 1 were repeated except that, in EXAMPLE 1, the amounts of methyl methacrylate, styrene, maleic anhydride were changed to 768 g, 144 g, 48 g, respectively, to obtain a thermoplastic acrylic resin.
Composition: MMA/St/MAH=76/17/7 wt % (mole ratio: B/A<1)
Molecular weight: Mw=13.4×10$^4$; Mw/Mn=2.01
Tg: 128° C.
The polymerization results are shown in TABLE 1.

Examples 8 to 14

Comparative Examples 3 and 4

Pressed films were molded according to the aforementioned method by using the thermoplastic acrylic resins obtained in EXAMPLES 1 to 7, COMPARATIVE EXAMPLES 1 and 2. The pressed films were molded according to the aforementioned method to prepare 100% drawn films, and then the optical properties thereof were evaluated. The measured results are shown in TABLE 2.

TABLE 1

| No. | Composition (wt %) | | | | | | Tg (° C.) | GPC | | Remaining volatile component (wt %) |
|---|---|---|---|---|---|---|---|---|---|---|
| | MMA | St | MAH | BzMA | MAA | GAH | | Mw × 10$^4$ | Mw/Mn | |
| EMXAMPLE 1 | 54 | 23 | 22 | — | — | — | 145 | 15.1 | 1.94 | <0.5 |
| EMXAMPLE 2 | 58 | 19 | 23 | — | — | — | 144 | 19.7 | 2.16 | <0.5 |
| EMXAMPLE 3 | 62 | 11 | 27 | — | — | — | 141 | 19.5 | 2.23 | <0.5 |
| EMXAMPLE 4 | 55 | 20 | 24 | 1 | — | — | 143 | 16.2 | 1.99 | <0.5 |
| EMXAMPLE 5 | 50 | 20 | 29 | 1 | — | — | 143 | 19.0 | 2.23 | <0.5 |
| EMXAMPLE 6 | 37 | 12 | — | — | 10 | 41 | 157 | 26.7 | 2.65 | — |
| EMXAMPLE 7 | 59 | 9 | — | 4 | 4 | 24 | 131 | 11.0 | 2.35 | — |
| COMPARATIVE EXAMPLE 1 | 100 | — | — | — | — | — | 121 | 10.2 | 1.89 | — |
| COMPARATIVE EXAMPLE 2 | 76 | 17 | 7 | | | | 128 | 13.4 | 2.01 | — |

TABLE 2

| No. | Thermoplastic resin | Tg (° C.) | Drawing temperature (° C.) | Photoelastic coefficient/ ×10$^{-12}$ Pa$^{-1}$ | Re/nm | B/A mole ratio | Light transmittance/ % | Optical properties |
|---|---|---|---|---|---|---|---|---|
| EMXAMPLE 8 | EMXAMPLE 1 | 145 | 165 | −0.8 | −50 | >1 | >85 | A |
| EMXAMPLE 9 | EMXAMPLE 2 | 144 | 145 | −1.3 | −43 | >1 | >85 | A |
| EMXAMPLE 10 | EMXAMPLE 3 | 141 | 161 | −1.2 | 3.9 | >1 | >85 | B |
| EMXAMPLE 11 | EMXAMPLE 4 | 143 | 163 | 0.1 | −38 | >1 | >85 | A |
| EMXAMPLE 12 | EMXAMPLE 5 | 143 | 163 | 0.1 | −54 | >1 | >85 | A |
| EMXAMPLE 13 | EMXAMPLE 6 | 157 | 177 | −0.8 | −80 | >1 | >85 | A |
| EMXAMPLE 14 | EMXAMPLE 7 | 131 | 151 | −0.5 | −60 | >1 | >85 | A |

TABLE 2-continued

| No. | Thermoplastic resin | Tg (° C.) | Drawing temperature (° C.) | Photoelastic coefficient/ ×10$^{-12}$ Pa$^{-1}$ | Re/nm | B/A mole ratio | Light transmittance/ % | Optical properties |
|---|---|---|---|---|---|---|---|---|
| COMPARATIVE EXAMPLE 3 | COMPARATIVE EXAMPLE 1 | 121 | 141 | −4.7 | −37 | — | >85 | x |
| COMPARATIVE EXAMPLE 4 | COMPARATIVE EXAMPLE 2 | 128 | 148 | −2.5 | −74 | <1 | >85 | x |

The optical property was distinguished according to the following standard.
A: Have birefringence, |C|<2.5×10$^{-12}$ Pa$^{-1}$, |Re|>30 nm
B: No birefringence, |C|<2.5×10$^{-12}$ Pa$^{-1}$, |Re|≤30 nm
X: |C|≥2.5×10$^{-12}$ Pa$^{-1}$ Examples 15 and 16

By referring to EXAMPLE 2, thermoplastic acrylic resins having different remaining monomer contents were prepared, compressed for 2 minutes at 250° C., and then their color tone change was observed. The measured results are shown in TABLE 3.

TABLE 3

| | Thermoplastic resin | Remaining monomer content (wt %) | Transparency | Color tone |
|---|---|---|---|---|
| EXAMPLE 15 | EXAMPLE 2 | 0.43 | Clear | Colorless |
| EXAMPLE 16 | | 0.85 | Clear | Colored to pale yellow |

It has been found that when the remaining monomer content is not more than 0.5% by weight, the coloring at heating is not observed.

Evaluation as Optical Film A

Having Birefringence

Examples 17 to 18

Comparative Example 5

Pressed films were molded according to the aforementioned method by using the thermoplastic acrylic resins obtained in EXAMPLES 1, 5, and COMPARATIVE EXAMPLE 1. The pressed films were molded according to the aforementioned method to prepare 100%, 200%, and 300% drawn films, and then the optical properties thereof were evaluated. The measured results are shown in TABLE 4.

TABLE 4

OPTICAL PROPERTIES AND OPTICAL PROPERTY CHANGE AT MOLDING PROCESSING

| | | No. | | | | | | | | | | |
|---|---|---|---|---|---|---|---|---|---|---|---|---|
| | | EXAMPLE 7 | | | | EXAMPLE 8 | | | | COMPARATIVE EXAMPLE 5 | | |
| | | Thermoplastic resin | | | | | | | | | | |
| | | (EXAMPLE 1) | | | | (EXAMPLE 5) | | | | (COMPARATIVE EXAMPLE 1) | | |
| Drawing condition | Temperature/° C. | — | 165 | 165 | 165 | — | 163 | 163 | 163 | — | 140 | 140 |
| | Ratio/% | 0 | 100 | 200 | 300 | 0 | 100 | 200 | 300 | 0 | 100 | 200 |
| Film properties (calculated based on 100 μm) | Positive/negative inherent birefringence | Negative | | | | Negative | | | | Negative | | |
| | Re/nm (@550 nm) | — | −50 | −103 | −162 | 0.8 | −54 | −90 | −122 | −1.0 | −37 | −67 |
| | Absolute value of birefringence (×10$^{-5}$ @550 nm) | — | 50 | 103 | 162 | 0.8 | 54 | 90 | 122 | 1.0 | 37 | 67 |
| | Percentage of change of birefringence |K| | −0.56 × 10$^{-5}$ | | | | −0.40 × 10$^{-5}$ | | | | −0.33 × 10$^{-5}$ | | |
| | Rth/nm(at 100% drawn) | — | | | | — | | | | — | | |
| | Photoelastic coefficient/ ×10$^{-12}$ Pa$^{-1}$ | −0.8 | | | | 0.1 | | | | −4.7 | | |
| Glass transition temperature/° C. | | 145 | | | | 143 | | | | 121 | | |
| Heat resistance, low photoelastic property | | ○ | | | | ○ | | | | x | | |

It is confirmed that the optical film A composed of the thermoplastic acrylic resin of the present invention has a high heat resistance and a low photoelastic coefficient. Further, the film has a considerable negative retardation and can control the value thereof so as to be a desired value by the draw ratio. These properties are suitable for the application of a retarder film, and the like.

Evaluation as Optical Film B
Having No Birefringence

Example 19

Comparative Example 5

Pressed films were molded according to the aforementioned method by using the thermoplastic acrylic resins obtained in EXAMPLE 3, and COMPARATIVE EXAMPLE 1. The pressed films were molded according to the aforementioned method to prepare 100%, 200%, and 300% drawn films, and the optical properties thereof were evaluated. The measured results are shown in TABLE 5.

TABLE 5

| | | \multicolumn{7}{c}{No.} |
| | | \multicolumn{4}{c}{EXAMPLE 19} | \multicolumn{3}{c}{COMPARATIVE EXAMPLE 5} |
| | | \multicolumn{7}{c}{Thermoplastic resin} |
| | | \multicolumn{4}{c}{(EXAMPLE 3)} | \multicolumn{3}{c}{(COMPARATIVE EXAMPLE 1)} |
|---|---|---|---|---|---|---|---|---|
| Drawing condition | Temperature/° C. | — | 161 | 161 | 161 | — | 140 | 140 |
| | Ratio/% | 0 | 100 | 200 | 300 | 0 | 100 | 200 |
| Film properties (calculated based on 100 μm) | Positive/negative inherent birefringence | \multicolumn{4}{c}{Positive} | \multicolumn{3}{c}{Negative} |
| | Re/nm (@550 nm) | 0.8 | 3.9 | 6.3 | 8.4 | −1.0 | −37 | −67 |
| | Absolute value of birefringence (×10⁻⁵ @550 nm) | 0.8 | 3.9 | 6.3 | 8.4 | 1.0 | 37 | 67 |
| | Percentage of change of birefringence |K| | \multicolumn{4}{c}{−0.03 × 10⁻⁵} | \multicolumn{3}{c}{−0.33 × 10⁻⁵} |
| | Rth/nm (at 100% drawn) | \multicolumn{4}{c}{1.7} | \multicolumn{3}{c}{—} |
| | Photoelastic coefficient/ ×10⁻¹² Pa⁻¹ | \multicolumn{4}{c}{−1.2} | \multicolumn{3}{c}{−4.7} |
| Glass transition temperature/° C. | | \multicolumn{4}{c}{141} | \multicolumn{3}{c}{121} |
| Heat resistance, low photoelastic property | | \multicolumn{4}{c}{○} | \multicolumn{3}{c}{x} |

It is confirmed that the optical film B composed of the thermoplastic acrylic resin of the present invention is excellent in heat resistance, and its optical properties (extremely low birefringence value and extremely small photoelastic coefficient) has high optical isotropy in comparison with conventional level. Also it is confirmed that the birefringence change rate at film molding and thereafter at optional drawing is extremely small. This feature is remarkably advantageous from the viewpoint that even if the film molding by extrusion molding and thereafter the drawing are carried out, birefringence could not be generated because there is no influence of orientation relating to polymer chain due to flow at melt molding.

These properties are suitable for the application of a polarizing plate protective film, and the like.

INDUSTRIAL APPLICABILITY

The molded article, for example, sheet or film composed of the thermoplastic acrylic resin of the present invention has a high heat resistance and a small photoelastic coefficient. In addition, since the molded article has an industrially advantageous melt moldability, it can be suitably used as a polarizing plate protective film used for a display such as a liquid display, a plasma display, an organic EL display, a field emission display, or a rear projection TV, a retarder such as a ¼ wavelength plate or a ½ wavelength plate, a liquid crystal optical compensation film such as a view field angle control film, a front panel of display, a display substrate, lens, and a transparent substrate or a transparent electrically conductive substrate, used for solar cell, and the like.

In addition, the resin can be used as a molded article such as a waveguide, lens, an optical fiber, a coating material for optical fiber, lens of LED or a lens cover in fields of an optical communication system, an optical switching system, an optical measurement system, and the like.

The invention claimed is:

1. A thermoplastic acrylic resin of a copolymer comprising 10 to 70% by weight of a repeating unit derived from a methacrylate monomer represented by the following formula (1), 5 to 40% by weight of a repeating unit derived from a vinyl aromatic monomer represented by the following formula (2), and 20 to 50% by weight of a repeating unit of a cyclic acid anhydride represented by the following formula (3), wherein a molar ratio (B/A) is within the range of more than 1 to not more than 10, wherein (A) is a content of the repeating unit of the vinyl aromatic monomer and (B) is a content of the repeating unit of the cyclic acid anhydride, and the total amount of remaining monomers to 100 parts by weight of the copolymer is not more than 0.5 part by weight:

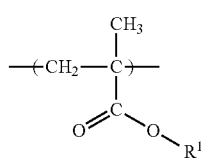

(1)

wherein R¹ represents hydrogen atom, a linear or branched alkyl group having 1 to 12 carbon atoms, or a cycloalkyl group having 5 to 12 carbon atoms;

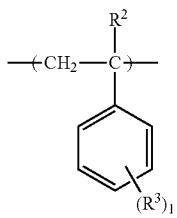

(2)

wherein $R^2$ and $R^3$ may be the same or different from each other, and represent hydrogen atom, a halogen group, a hydroxyl group, an alkoxyl group having 1 to 12 carbon atoms, a nitro group, a linear or branched alkyl group having 1 to 12 carbon atoms, and l is an integer of 1 to 3;

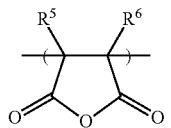

(3)

wherein $R^5$ to $R^6$ may be the same or different from each other, and represent hydrogen atom, a linear or branched alkyl group having 1 to 12 carbon atoms, wherein the thermoplastic acrylic resin has the following optical property (i):
 (i) an absolute value of a photoelastic coefficient (C) being less than $2.5 \times 10^{-12}$ $Pa^{-1}$.

2. The thermoplastic acrylic resin of claim 1, further comprising 0.1 to 5% by weight of a repeating unit derived from a methacrylate monomer having an aromatic group represented by the following formula (5):

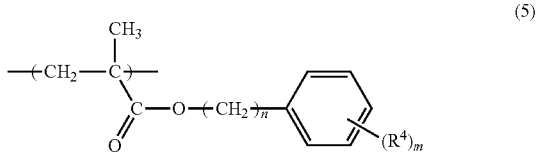

(5)

wherein $R^4$ represents hydrogen atom, a halogen group, a hydroxyl group, an alkoxyl group having 1 to 12 carbon atoms, a nitro group, a linear or branched alkyl group having 1 to 12 carbon atoms, m is an integer of 1 to 3, and n is an integer of 0 to 2.

3. The thermoplastic acrylic resin of claim 1, having a weight-average molecular weight of 10,000 to 400,000 by GPC measuring method, and a molecular weight distribution of 1.8 to 3.0.

4. The thermoplastic acrylic resin of claim 1, wherein the resin comprises a copolymer derived from methyl methacrylate as the repeating unit derived from the methacrylate monomer, styrene as the repeating unit derived from the vinyl aromatic monomer, maleic anhydride as the repeating unit of the cyclic acid anhydride, and benzyl methacrylate as the repeating unit derived from the methacrylate monomer having an aromatic group.

5. The thermoplastic acrylic resin of claim 1, having the following optical property (ii):
 (ii) an absolute value of retardation (Re) in the in-plane direction being more than 30 nm and not more than 300 nm.

6. The thermoplastic acrylic resin of claim 1, having the following condition (iii):
 (iii) a glass transition temperature (Tg) being not less than 120° C.

7. The thermoplastic acrylic resin of claim 1, having the following condition (iv):
 (iv) a total transmittance being not less than 85%.

8. A molded article comprising the thermoplastic acrylic resin of claim 1.

9. The sheet or film comprising the molded article of claim 8.

10. The sheet or film of claim 9, wherein the sheet or film is a sheet or film molded by extrusion molding, drawn in at least one axial direction, and having a draw ratio of 0.1 to 300%.

11. The sheet or film of claim 9, wherein the sheet or film is a sheet or film molded by cast molding, drawn in at least one axial direction, and having a draw ratio of 0.1 to 300%.

12. A retardation plate comprising the sheet or film of claim 9.

13. A retardation film comprising the sheet or film of claim 9.

14. The thermoplastic acrylic resin of claim 1, having the following optical property (v):
 (v) a value of a slope K in the equation (a) of linear relationship between birefringence ($\Delta n(S)$) after drawing and a draw ratio (S) determined by least squares approximation has the following expression (b):

$$\Delta n(S) = K \times S + C \quad (a)$$

$$|K| < 0.30 \times 10^{-6} \quad (b).$$

15. The thermoplastic acrylic resin of claim 14, further having the following optical property (vi):
 (vi) an absolute value of retardation (Re) in the in-plane direction being not more than 30 nm.

16. The thermoplastic acrylic resin of claim 14, further having the following optical property (vii):
 (vii) an absolute value of retardation (Rth) in the thickness direction being not more than 30 nm.

17. The thermoplastic acrylic resin of claim 14, having the following condition (viii):
 (viii) a glass transition temperature (Tg) being not less than 120° C.

18. The thermoplastic acrylic resin of claim 14, further having the following condition (ix):
 (ix) a total transmittance being not less than 85%.

19. A molded article comprising the thermoplastic acrylic resin of claim 14.

20. The sheet or film comprising the molded article of claim 19.

21. The sheet or film of claim 20, wherein the sheet or film is a sheet or film molded by extrusion molding, drawn in at least one axial direction, and having a draw ratio of 0.1 to 300%.

22. The sheet or film of claim 20, wherein the sheet or film is a sheet or film molded by cast molding, drawn in at least one axial direction, and having a draw ratio of 0.1 to 300%.

23. A protective film for polarizing plate comprising the sheet or film of claim 20.

24. A lens comprising the molded article of claim 8.

25. A transparent plastic substrate comprising the sheet or film of claim 9.

26. A lens comprising the molded article of claim 19.

27. A transparent plastic substrate comprising the sheet or film of claim 20.

28. The thermoplastic acrylic resin of claim 1, wherein the molar ratio (B/A) is within the range from more than 1 to 3.12 or less.

* * * * *